(12) United States Patent
Messmann et al.

(10) Patent No.: US 9,708,166 B2
(45) Date of Patent: Jul. 18, 2017

(54) SELF-PROPELLED TROLLEY

(75) Inventors: Soeren Messmann, Fanoe (DK); Jan Emil Westergaard, Brande (DK)

(73) Assignees: BLUE WATER SHIPPING A/S (DK); SIEMENS AKTIENGESELLSCHAFT (DE)

( * ) Notice: Subject to any disclaimer, the term of this patent is extended or adjusted under 35 U.S.C. 154(b) by 57 days.

(21) Appl. No.: 14/125,609

(22) PCT Filed: Jun. 12, 2012

(86) PCT No.: PCT/EP2012/061072
§ 371 (c)(1),
(2), (4) Date: Feb. 25, 2014

(87) PCT Pub. No.: WO2012/171895
PCT Pub. Date: Dec. 20, 2012

(65) Prior Publication Data
US 2014/0169930 A1    Jun. 19, 2014

(30) Foreign Application Priority Data

Jun. 15, 2011   (EP) .................................... 11169947

(51) Int. Cl.
*B60P 3/40*    (2006.01)
*B66F 9/065*   (2006.01)
(Continued)

(52) U.S. Cl.
CPC ............... *B66F 9/065* (2013.01); *B60P 3/40* (2013.01); *B60P 7/12* (2013.01); *F03D 13/40* (2016.05); *F05B 2260/02* (2013.01)

(58) Field of Classification Search
CPC .. B66F 9/065; B66F 7/20; F03D 1/005; B60P 3/40; F41A 9/87
See application file for complete search history.

(56) References Cited

U.S. PATENT DOCUMENTS 2,705,083 A    3/1955  Soderstrom
3,095,981 A *  7/1963  Thorson .................... F41A 9/87
                                                       254/134
(Continued)

FOREIGN PATENT DOCUMENTS

CH    553125 A    8/1974
CN   1837015 A    9/2006
(Continued)

OTHER PUBLICATIONS

PCT/EP2012/061072—International File Date: Jun. 12, 2012—International Search Report and Written Opinion. Date of Mailing: Sep. 26, 2012; ; Siemens Aktiengesellschaft; 9 pages.
(Continued)

*Primary Examiner* — Gerald McClain
*Assistant Examiner* — Ronald Jarrett
(74) *Attorney, Agent, or Firm* — Schmeiser Olsen & Watts LLP

(57) ABSTRACT

The invention describes a self-propelled trolley for handling a wind-turbine blade, which trolley comprises a driving device for propelling the trolley between locations; and a lifting device, which lifting device is realised to raise and lower the wind-turbine blade. The invention also describes a method of handling a wind-turbine blade, which method comprises the steps of positioning a self-propelled trolley according to any of the preceding claims at a point underneath the wind-turbine blade; actuating a lifting device of the self-propelled trolley to raise or lower the wind-turbine blade; and controlling a driving device of the self-propelled trolley to propel the trolley between locations.

15 Claims, 4 Drawing Sheets

(51) Int. Cl.
*B60P 7/12* (2006.01)
*F03D 13/40* (2016.01)

(56) References Cited

U.S. PATENT DOCUMENTS

| | | | |
|---|---|---|---|
| 3,882,964 A | | 5/1975 | Schellenberg |
| 4,596,300 A | * | 6/1986 | Mankey ............... B60K 17/14 180/305 |
| 4,950,126 A | * | 8/1990 | Fabiano ............... B66F 11/048 248/184.1 |
| 6,283,220 B1 | * | 9/2001 | Carter ............................ 169/24 |
| 6,778,097 B1 | * | 8/2004 | Kajita et al. ................. 340/12.5 |
| 8,007,221 B1 | * | 8/2011 | More et al. .................... 414/680 |
| 2005/0031431 A1 | * | 2/2005 | Wobben .................... B60P 3/40 410/45 |
| 2011/0008147 A1 | * | 1/2011 | Lemos et al. ................. 414/800 |

FOREIGN PATENT DOCUMENTS

| | | | | |
|---|---|---|---|---|
| CN | 201209103 Y | | 3/2009 | |
| CN | 201325491 Y | | 10/2009 | |
| CN | 101970331 A | | 2/2011 | |
| DE | 102 11 357 A1 | | 9/2002 | |
| DE | 10211357 | | 9/2002 | |
| DE | EP1798104 | * | 6/2007 | ............... B60P 3/40 |
| NO | 137187 C | | 1/1978 | |
| WO | WO 2008046728 A1 | | 4/2008 | |
| WO | WO 2009112887 | | 9/2009 | |

OTHER PUBLICATIONS

Kukarobotgroup, "Kuka Omnimove(R)", You Tube, (May 4, 2010), XP054975970.
Markus Waibel.: "Omniwheels Gaining Popularity in Robotics", IEEE Spectrum, (Oct. 4, 2010), p. 1-6, XP003035790.
Third Party Observation for Application No. 12729456.9, mailed on Jun. 26, 2015.
Chinese Office Action and Search Report for Chinese Application No. 201280029429.2, mailed on May 6, 2015.
Chinese Office Action dated Feb. 2, 2016; Application No. 201280029429.2; Siemens Aktiengesellschaft; 22 pgs.
Office Action for CN Application No. 201280029429.2, mailed on Oct. 8, 2016.

* cited by examiner

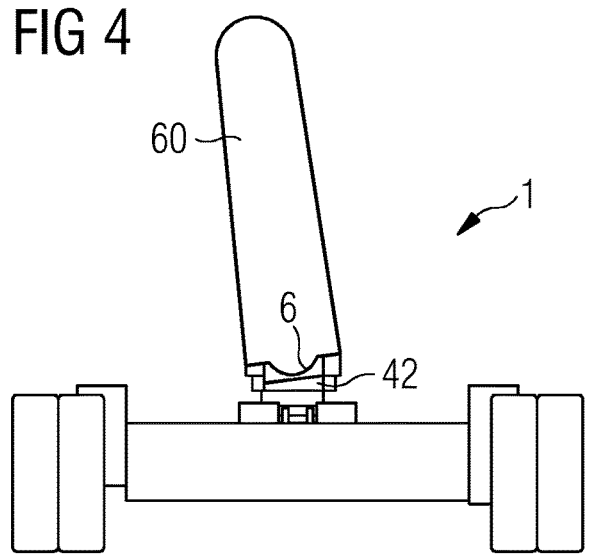
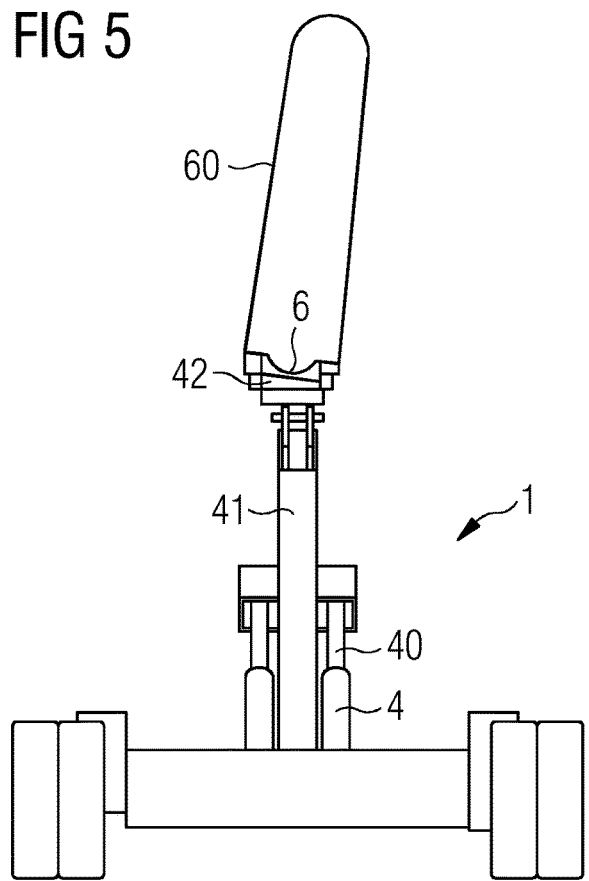

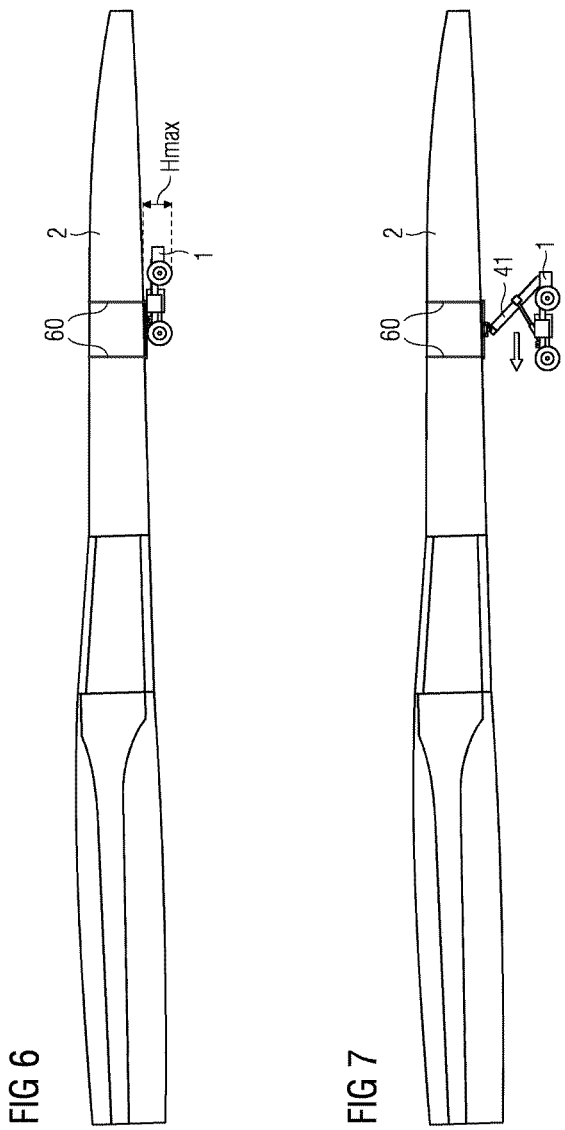

SELF-PROPELLED TROLLEY

CROSS-REFERENCE TO RELATED APPLICATIONS

This application claims priority to PCT Application No. PCT/EP2012/061072, having a filing date of Jun. 12, 2012, and to European Application 11169947.6, having a filing date of Jun. 15, 2011, the entire contents of which are hereby incorporated by reference.

FIELD OF TECHNOLOGY

The invention describes a self-propelled trolley for handling a wind-turbine blade, and a method of handling a wind-turbine blade.

BACKGROUND

A rotor blade for a wind-turbine can be tens of meters in length. One end of the blade, the blade root, generally has a circular cross-section for attaching to a pitch bearing. The blade root extends into a transition region, and beyond the transition region, the blade has an airfoil shape with curved surfaces, becoming progressively narrower and flatter, and tapering to a tip at the other extreme end of the blade. Such a blade is generally made of a rigid and relatively light material such as molded fiberglass. A blade with a length of about 95 m can weigh about 32,000 kg and can have a diameter of several meters at the root end. Because of its large dimensions and unwieldy shape, a lot of handling is involved in transporting a blade from a manufacturing site to a local storage site, from the storage site to a transport device, from the transport device to the wind-turbine site, etc. Because of its length, a blade is generally stored horizontally, for example on one of a stack of shelves that might be in an indoor hangar. To transfer a blade onto a transport device such as a ship or a railcar, a crane is generally used. For a crane to access a blade, it may be necessary to first fetch the blade from its shelf and to deposit it at an interim location such as a platform to allow crane access. To this end, a forklift truck or similar load transportation vehicle is usually used. For example, two forklifts can be used to hold and lift a blade, one at each end. Evidently, the drivers of the forklift trucks must exactly synchronize their movements, for example by line-of-sight, or verbally over a radio connection, in order to avoid damage to the blade. Alternatively, a third person might assist the drivers of the forklift trucks by observing and issuing commands.

In another approach, one forklift truck can be deployed to first transfer one end of the blade to an interim location, and then to 'fetch' the other end of the blade. It may be necessary to firmly secure the first end of the blade at the interim location to ensure it that does not move while the other blade end is being moved into place. Once the blade has been transferred to the interim location, it can be lifted, for example by crane, on to a transportation device such as a lorry or roll-on roll-off ship. In any case, these known procedures are very time-consuming, involve a lot of personnel and handling, and are not without risk of damage to the blade. An automated approach using one or more automated guided vehicles to fetch a blade and to carry it along a path defined by a guiding lane would require that blades are always stored at positions defined by guiding lanes, and any destination ferry or ship would also have to be equipped with such guiding lanes. Obviously, such a solution would be very complex and therefore costly and impracticable.

SUMMARY

It is therefore an advantage of the invention to provide a safer and more straightforward way of handling a wind-turbine blade. This advantage is achieved by the self-propelled trolley, and by the method of handling a wind-turbine blade.

The self-propelled trolley for handling a wind-turbine blade comprises one or more driving device for propelling the trolley between locations, and at least one lifting device, which lifting device is realized to raise and lower the wind-turbine blade.

Here, the term "self-propelled" is to be understood to mean that the trolley does not require a human driver to control it, and it is therefore not equipped with a cabin, seat, steering wheel etc. Instead, the driverless trolley can move in response to commands received from a remote source, or from commands previously stored in a control unit of the trolley, as will be explained in the following.

An advantage of the self-propelled trolley is that resources can be more economically used during handling, so that the overall costs of constructing a wind turbine or a wind farm can be reduced. For example, by using the self-propelled trolley according to the invention, it is not necessary to use forklifts to transfer a blade from storage to an interim location from which the blade is then lifted by crane to a further transportation device. Instead, the self-propelled trolley can be used to directly transfer the blade from the storage device to the transportation device, as will become clear in the description below.

The disclosed method of handling a wind-turbine blade comprises the steps of positioning a self-propelled trolley at a point underneath the wind-turbine blade; actuating a lifting device of the self-propelled trolley to raise or lower the wind-turbine blade; and controlling a driving device of the self-propelled trolley to propel the trolley between locations.

Particularly advantageous embodiments and features of the invention are given by the dependent claims, as revealed in the following description. Features of different claim categories may be combined as appropriate to give further embodiments not described herein.

Here and in the following, the term "trolley" is to be understood to encompass essentially a chassis on wheels, castors or the like, constructed for the transport of a large and heavy object, in this case a wind-turbine blade. The lifting device can be arranged in or on the chassis, and the driving device can encompass any device suitable for moving the trolley with a required degree of smoothness, preferably a number of wheels arranged on one or more axles. In the following, without restricting the invention in any way, it may be assumed that the trolley is propelled on wheels.

As indicated above, the self-propelled trolley is not driven by a human driver, but can instead move of its own accord, whereby it is clear that the self-propelled trolley will move according to a sequence of defined instructions. Therefore, in one embodiment, the self-propelled trolley comprises a remote-control interface realized to control the driving device. For example, a remote-control interface can be realized to receive commands such as "move forward", "move to the left", etc., and to convert these into appropriate drive control signals. The signals can be radio signals transmitted and received using established radio-control components, remote control infrared signals sent over a line-of-sight optical connection, wireless local area network signals, etc.

In one embodiment, the driving device comprises a motor and a drive train for transferring power to two or more wheels of the trolley. The motor can be any suitable kind of motor, for example a diesel motor, a linear motor, an electric motor, etc., and the drive train can comprise the usual elements or components required to transfer a rotational motion of a drive shaft to the wheels of the trolley.

It may be that the space within which a blade can be maneuvered is limited, for example the trolley may need to move about among blade storage racks in a storage hangar. Therefore, in an embodiment, the trolley comprises an all-wheel drive system such as four-wheel drive, individual wheel drive, etc., enabling the self-propelled trolley to move in a very flexible manner.

Established devices for transporting loads must be able to counteract the weight of the load. For example, a forklift truck must have a large counterweight to balance the load which is carried on the fork essentially at the front of the forklift. The trolley is realized without any such counterweight. In an embodiment, therefore, the lifting device is realized such that the point at which a load is supported by the lifting device is arranged over the trolley itself for any position of the lifting device. In other words, the load is borne over or above the trolley, for example above a region or frame bounded by axles of the driving device or by a chassis of the trolley.

The self-propelled trolley is designed to be able to access wind turbine blades stored at varying heights, for example at different levels of a storage rack. Also, the lifting device is preferably extendable while also being robust enough to bear a large fraction of the weight of a blade. Therefore, in an embodiment, the lifting device comprises a hydraulic lifting arrangement, for example one or more hydraulic cylinders with pistons that can be extended to a favorable length. Such a hydraulic lifting arrangement might comprise vertically arranged hydraulic cylinders, so that the pistons can be extended essentially vertically, and the blade can rest on the extended pistons. However, such an arrangement would require an additional device of supporting the hydraulic cylinders when the weight of a blade is resting on the extended pistons in order to ensure a minimum of lateral stability. In an embodiment, the hydraulic cylinders are tiltably arranged on the chassis of the trolley, and the ends of the pistons are connected to a tiltable beam. In this arrangement, when the pistons are extended, the beam is tilted upward, so that an outer end of the beam is raised. This will become clear with the aid of the diagrams below. In the same way, when the pistons retract into the hydraulic cylinders, the beam is tilted back down again, so that the outer end of the beam is lowered.

Any components of the lifting device that require power, for example a motor or a pump, can be driven by the motor that is used to drive the wheels of the trolley, or may be driven by an additional motor or a battery. Such a battery could also be used to provide electricity to a communications interface as mentioned above.

The lifting device, for example the arrangement described above with hydraulic cylinders and a tiltable beam, is rotatable relative to the driving device. For example, the entire lifting device can be arranged on a platform, which platform can be rotated relative to the rest of the trolley. In such an embodiment, when the blade is resting on the lifting device, the rest of the trolley underneath the platform, i.e. driving device, chassis, etc., can be rotated. This can be advantageous for positioning the wheels in the direction in which the trolley is to travel.

To securely hold a blade while the trolley is moving from one location to another, the trolley comprises a holding device for holding the wind-turbine blade at a point along its length. In an embodiment of the invention, the holding device comprises a cradle, shaped to accommodate a curved surface of the wind-turbine blade. For example, the cradle can comprise a concave curved shape. With such a cradle, the blade can rest in the holding device, and the shape of the holding device can provide a degree of stability during handling. To ensure that the loading point—i.e. the point at which the blade rests on the holding device—does not extend outward beyond a framework of the trolley, the holding device is connected to the lifting device such that at any point of travel of the lifting device, the holding device is always arranged above the trolley within a region bounded by the framework or chassis of the trolley. The holding device can be lined with a protective lining such as a low-friction foam rubber to avoid damage to the blade surface.

The blade should have some degree of freedom when supported by the holding device. Therefore, the blade can move relative to the trolley, or at least relative to the lifting device, in order to prevent damage to the lifting device. Therefore, in one embodiment, the holding device is connected to the lifting device by a universal joint such as a Cardan joint. With such a connection, the blade can be moved freely relative to the lifting device while still being supported at that point by the holding device and lifting device. The freedom of movement of such a universal joint also compensates to some extent for unevenness over the transport path, e.g. dents or surface damage.

Before being transported to a new destination, wind turbine blades may be stored on shelves or on the ground. To ensure that a trolley can be maneuvered under a blade stored at a low height, for example on the ground, the maximum height of the trolley—measured from ground level—should not exceed the height of a propelling device of the trolley. For example, if the trolley comprises wheels, the maximum height of the trolley in its retracted state should not exceed the height of the wheels. Wheels upon which readily available tires can be fitted might be a choice. Such tires can be of the type used for transport vehicles such as a pick-up truck, a lorry, etc. Therefore, in one embodiment, the maximum height of the trolley comprises at most 1.5 m, more preferably at most 1.25 m, most preferably at most 1 m, when the lifting device is in a non-extended, i.e. folded or retracted, position. In this way, the trolley can easily fit under the airfoil end of a blade, even if the root end is resting on the ground. In its extended state, the trolley can have an overall height—measured from ground level—to about 5 m or more, depending on the realization of the lifting device.

The cross-sectional area of a blade will vary along its length, owing to the airfoil shape of wind-turbine blade. Furthermore, the trolley is designed to be able to transport blades of various lengths. Blades of different length will also have different body shapes or cross-sectional areas. Therefore, in one embodiment, the cradle is detachably connected to the holding device, so that a cradle of different size or shape can be attached to the holding device as necessary.

In a further embodiment, the holding device is realised to accommodate a securing element for securing the wind-turbine blade to the holding device. For example, such a securing element can comprise web lashing or some other suitable kind of band or belt that can be tightened around the body of the blade when it is resting in the holding device. Such a band can be passed through appropriate slits in the holding device so that they are effectively prevented from slipping. To protect the top of the blade, the securing device can comprise a protective liner or cap, for example an aluminum edge protection cap, lined with a softer material such as felt or carpeting, that lies over the top of the blade and is held in place by web lashing.

As mentioned above, the trolley comprises a remote-control interface for receiving commands from a remote source, for example from a controller observing and controlling the movements of the trolley. In a further embodiment, for additional safety, the trolley comprises at least one sensor for sensing a position of the trolley. For example, an optical sensor or an ultrasonic sensor could be arranged at some point along one or more sides of the trolley, to detect whether the trolley is too close to another object. In this way, the trolley can avoid collisions between the blade end and other objects that may be overlooked by the controller.

Since various kinds of cradle might be used, and various different types or lengths of lashing, it may be that these are readily available in order to save time during the securing process. Therefore, in a further embodiment, the trolley comprises a storage container for storing one or more utility elements such as different-sized cradles, different lengths of lashings, replacement parts for a holding element, etc. Such a storage container can be arranged on the trolley at any convenient location and may be sealable to protect the contents.

In a blade transfer step, one end of a blade can be held by a trolley, while the other end can be moved by forklift. In such an approach, the forklift driver can lead the transfer step, while the self-propelled trolley essentially "follows" the movements of the forklift. To this end, the driver of the forklift can issue appropriate commands to the trolley, or a controller standing at a distance can observe the forklift and trolley and issue commands as appropriate. Together, the forklift and the trolley can move the blade to its next location, for example a transport device such as a roll-on roll-off ship, a railcar, etc. Alternatively, a first end can be moved to a next location using the trolley, which then "parks" that end of the blade, and returns to fetch the other end of the blade.

In a further embodiment, a method of handling a wind-turbine blade comprises the steps of deploying a first self-propelled trolley to move the tip end of the wind-turbine blade to a target destination while simultaneously deploying a second self-propelled trolley to move the root end of the wind-turbine blade to a corresponding target destination. In this way, two such self-propelled trolleys can be synchronously controlled to arrange themselves under a blade, to simultaneously raise the blade, to move the blade to its new location, to lower the blade again, and finally to remove themselves from under the blade once the blade is "parked" at its target destination.

For such a realization, a controller may have to observe both trolleys and issue commands to both trolleys, for example using two remote control units. This may be complicated and prone to error. Therefore, in one embodiment, a trolley comprises a communications interface for communicating with a communications interface of another self-propelled trolley. With such an interface, it may be sufficient for a controller to control a first of two self-propelled trolleys, which in turn informs the second trolley of its current movements. The second trolley could then "mimic" the movements of the first trolley. In this way, the movements or actions of both trolleys can be synchronized in a relatively straightforward way. Regardless of how a trolley is controlled (or controls itself), path computation and corrections can be carried out "on the fly", so that the blade transfer can be carried out in a smooth manner.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention, wherein:

FIG. 4 shows a front view of the trolley of FIG. 1 in a resting state;

FIG. 5 shows a front view of the trolley of FIG. 1 in an extended state;

FIG. 6 shows a side view of the trolley of FIG. 1 in a resting state under a wind-turbine blade; and FIG. 7 shows a side view of the trolley of FIG. 1 in an extended state under the wind-turbine blade.

In the diagrams, like numbers refer to like objects throughout. Objects in the diagrams are not necessarily drawn to scale.

DETAILED DESCRIPTION

Figure 1:
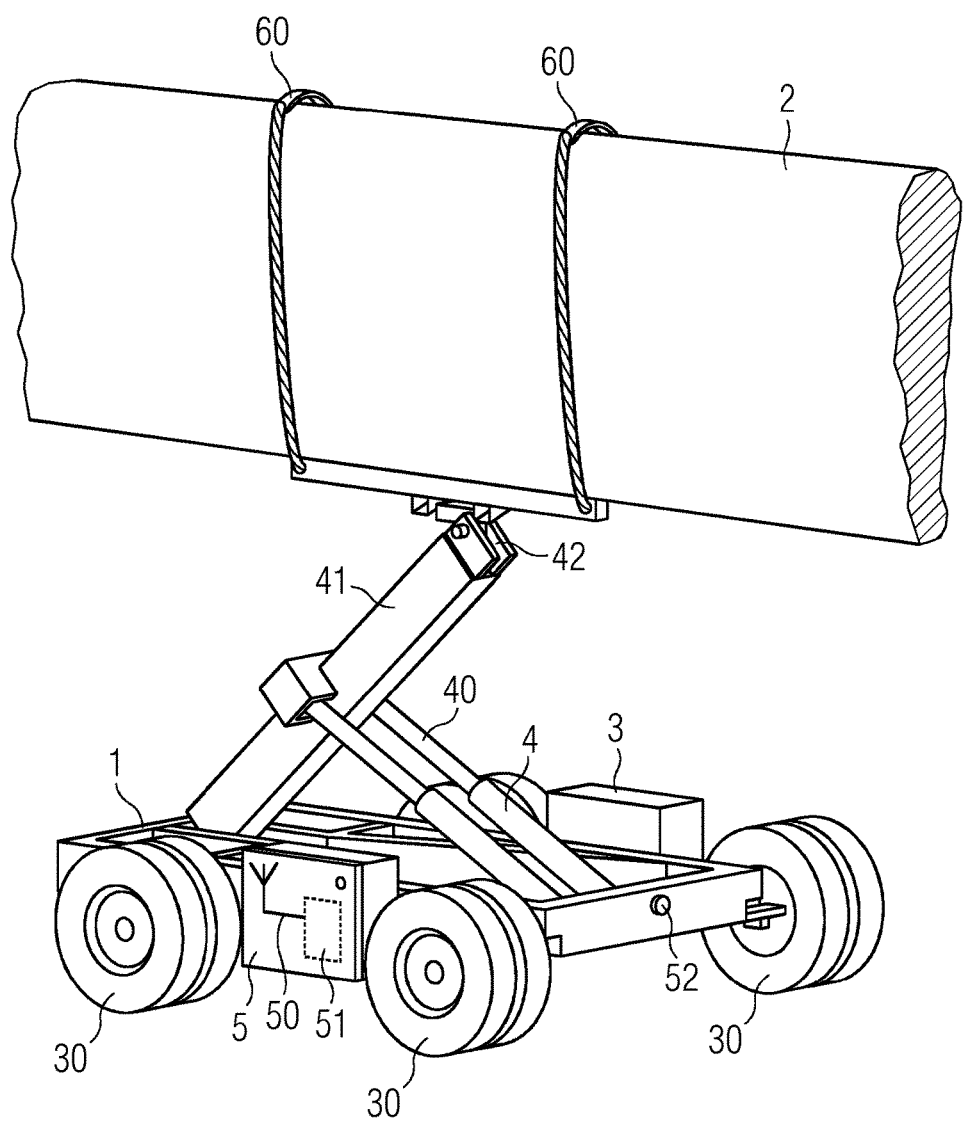
FIG. 1 shows a self-propelled trolley according to an embodiment of the invention, in the act of handling a wind-turbine blade.

FIG. 1 shows a self-propelled trolley 1 according to an embodiment, in the act of handling a wind-turbine blade 2 in a transfer step. The trolley 1 comprises a chassis 10 and a hydraulic lifting device 4, 40, 41 with two hydraulic cylinders 4, two pistons 40, and a lifting beam 41. When the pistons 40 are extended, the beam 41 is raised. At an outer end of the beam 41, a holding device 6 is mounted using a Cardan joint 42, allowing the load (in this case the blade 2) some degree of freedom relative to the lifting device. The blade 2 is securely attached to the holding device 6 using a frame 60 or web lashing 60. Once the blade 2 is secured, the trolley 1 can move its load to the next location. To this end, a motor 3 drives four wheels 30 arranged on the chassis 10. The motor 3 is controlled by a control unit 5, which can receive signals over an antenna 50 and interpret these in a communications interface 51. The control unit 5 may also receive signals issued by sensors 52 arranged on the trolley 1, for example optical sensors 52 for detecting proximity to other objects. In this embodiment, the motor 3 can also drive the hydraulic cylinders 4.

Figure 2:
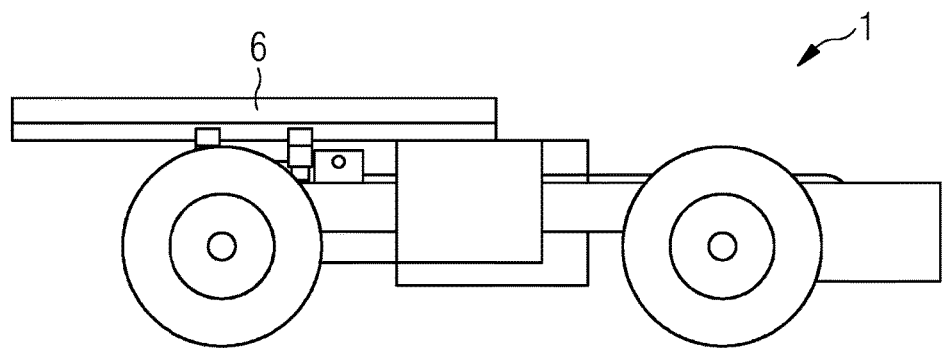
FIG. 2 shows a side view of the trolley of FIG. 1 in a resting state.
Figure 3:
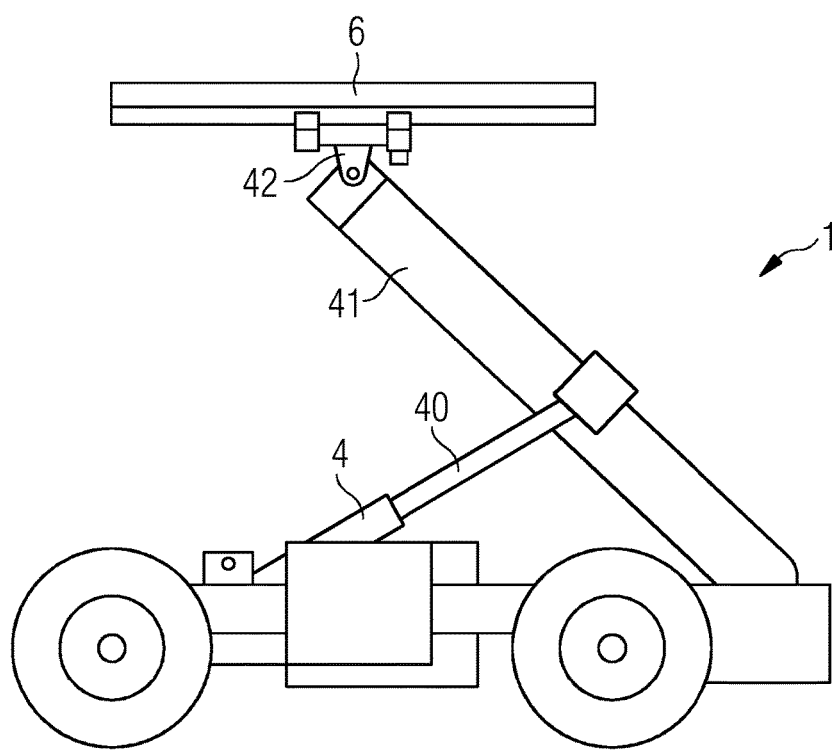
FIG. 3 shows a side view of the trolley of FIG. 1 in an extended state.

FIG. 2 shows a side view of the trolley of FIG. 1 in a resting state, i.e. the pistons are retracted in the hydraulic cylinders 4. In this state, the trolley can be brought into position under a blade. FIG. 3 shows a side view of the trolley 1 in an extended state, i.e. the pistons 40 extend from the hydraulic cylinders 4 and the beam 41 is raised. In this state, the trolley 1 can support part of the weight of a blade, which can then be moved from one location to another.

FIGS. 4 and 5 show front views corresponding to the side views of FIGS. 2 and 3. Here, a frame 60 or web lashing 60 is also shown, as it would appear when in place about a blade resting on the holding device 6, and the concave shape of a cradle-shaped holding device 6 is also clearly visible. These diagrams also illustrate the function of the Cardan joint 42, which allows the holding device 6 to tilt relatively freely relative to the beam 41 of the lifting device.

FIGS. 6 and 7 show a side view of the trolley of FIG. 1 under the tip end of a wind-turbine blade, with its lifting device in a resting or folded state (FIG. 6) and in an extended state (FIG. 7). Of course, the wheels of the trolley 1 are in contact with the ground, which is not shown here for the sake of clarity. The root end of the blade, which is not shown in the diagram, can be supported on a shelf, by a forklift, by another trolley, etc., or can rest on the ground. Either way, the maximum height $H_{max}$ of the trolley 1 when the lifting device is retracted is so low as to allow the trolley 1 to be maneuvered under the tip section or the airfoil section of the blade 2. As the diagrams show, when the trolley extends the lifting device, the holding device 6 remains in position under the blade 2, while the trolley itself is compelled to adjust its position sideways in the direction indicated by the arrow. In this way, the load on the holding device effectively moves in the opposite direction, so that the load always acts on a point over the body of the trolley. These diagrams also show that, if the securing device 60 is a rigid frame 60 shaped to fit over a region of the blade near the tip end, the trolley 1 could move into place from the tip of the blade 2, by allowing the blade tip to pass through the enclosing frame 60, and can move sideways until the blade 2 fits snugly into the frame 60.

Although the present disclosure has been disclosed in the form of embodiments and variations thereon, it will be understood that numerous additional modifications and variations could be made thereto without departing from the scope of the invention. For example, a self-propelled trolley could comprise two hydraulic lifting device arranged opposite to one another, so that the beams move relatively to one another in a scissors-like fashion. Two such hydraulic lifting device may provide a favorable increase in the load-bearing capacity of the trolley.

For the sake of clarity, it is to be understood that the use of "a" or "an" throughout this application does not exclude a plurality, and "comprising" does not exclude other steps or elements. Reference to a unit or module does not preclude the use of more than one unit or module.

The invention claimed is:

1. A self-propelled trolley for handling a wind-turbine blade of a wind-turbine, the trolley comprises:
    a driving device for propelling the trolley between locations;
    a lifting device, the lifting device configured to raise and lower the wind-turbine blade, wherein a maximum height of the trolley is less than or equal to the height of a wheel of the trolley when the lifting device is in a non-lifted position; and
    a holding device, wherein the holding device is arranged for holding the wind-turbine blade at a point along its length, wherein the holding device and lifting device are connected by a universal joint to allow the blade free movement, between the lifting device and the holding device, during transport of the wind-turbine blade.

2. The self-propelled trolley according to claim 1, comprising a remote control interface, the remote-control interface configured to control the driving device.

3. The self-propelled trolley according to claim 1, wherein the driving device comprises a motor and a drive train for transferring power to two or more wheels of the trolley.

4. The self-propelled trolley according to claim 1, wherein the lifting device is configured to support a load, such that a point at which the load is supported by the lifting device is arranged over the trolley for any position of the lifting device.

5. The self-propelled trolley according to claim 1, wherein the lifting device comprises a hydraulic lifting arrangement.

6. The self-propelled trolley according to claim 1, wherein the lifting device is rotatable relative to the driving device.

7. The self-propelled trolley according to claim 1, wherein the holding device comprises a cradle the cradle being shaped to accommodate a curved surface of the wind-turbine blade.

8. The self-propelled trolley according to claim 1, wherein the holding device is configured to accommodate a securing element for securing the wind-turbine blade to the holding device.

9. The self-propelled trolley according to claim 1, wherein a maximum height ($H_{max}$) of the trolley comprises at most 1.5 m when the lifting device is in a non-extended position.

10. The self-propelled trolley according to claim 1, comprising a communications interface for communicating with a communications interface of a further transport device.

11. The self-propelled trolley according to claim 1, comprising at least one sensor for sensing a relative position of the trolley.

12. The self-propelled trolley according to claim 1, wherein a maximum height ($H_{max}$) of the trolley comprises at most 1.25 m when the lifting device is in a non-extended position.

13. A method of handling a wind-turbine blade, the method comprises the steps of:
    positioning a self-propelled trolley at a point underneath the wind-turbine blade;
    providing a holding device for the wind-turbine blade;
    actuating a lifting device of the self-propelled trolley to raise or lower the wind-turbine blade on the holding device;
    providing a universal joint between the lifting device and the holding device;
    transporting the wind-turbine blade while allowing the holding device to freely rotate with respect to the lifting device; and
    controlling a driving device of the self-propelled trolley to propel the trolley between locations.

14. The method according to claim 13, comprising the steps of
    deploying a self-propelled trolley to transfer a tip end of the wind-turbine blade to a target destination; and
    deploying a self-propelled trolley to move a root end of the wind-turbine blade to a corresponding target destination.

15. A self-propelled trolley for handling a wind-turbine blade, the trolley comprises:
    a driving device for propelling the trolley between locations;
    a holding device configured for holding the wind-turbine blade; and
    a lifting device, connected to the holding device by a universal joint, the lifting device configured to raise and lower the wind-turbine blade, wherein the holding device is connected to the lifting device with the universal joint such that the holding device may freely rotate with respect to the lifting device during transport of the wind-turbine blade.

\* \* \* \* \*